July 30, 1963  R. N. ROWE  3,099,504
ELECTRICITY DISTRIBUTING CONDUIT APPARATUS
Original Filed June 13, 1955  2 Sheets-Sheet 1
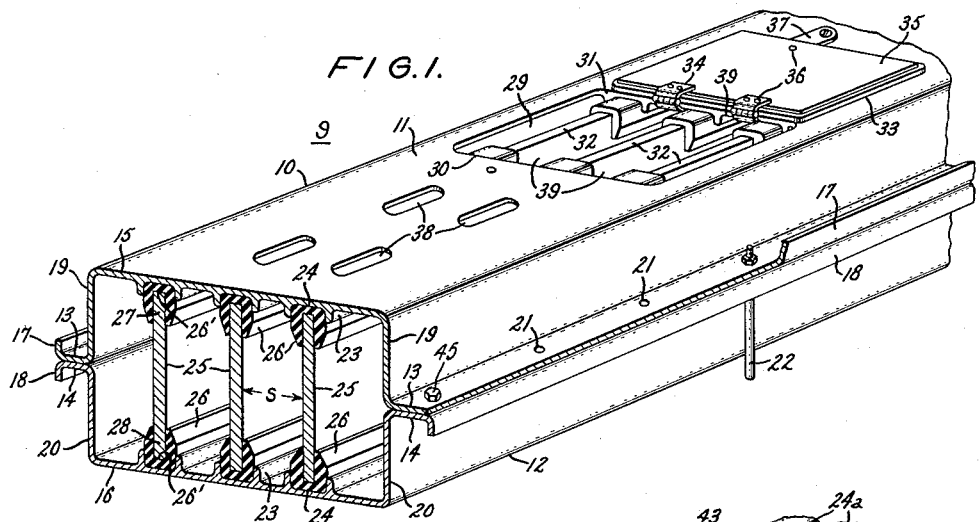
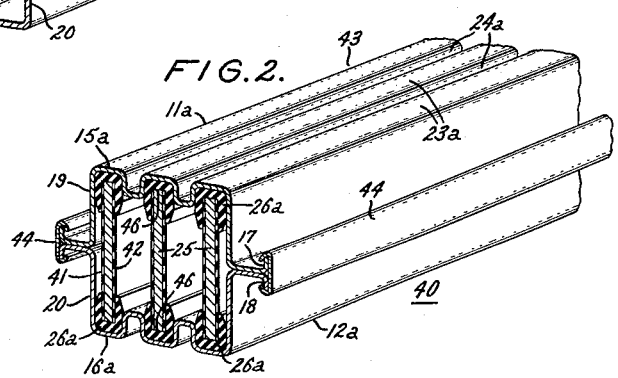
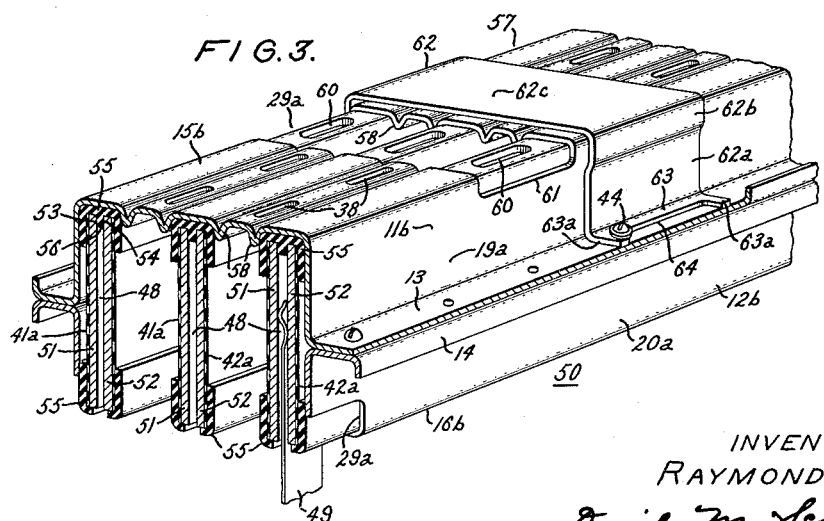
INVENTOR:
RAYMOND N. ROWE,
BY David M. Schiller
ATTORNEY.

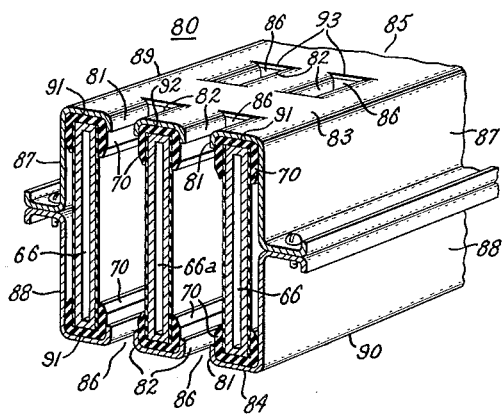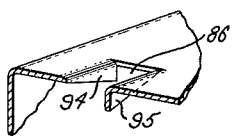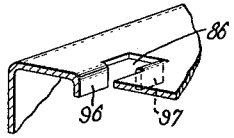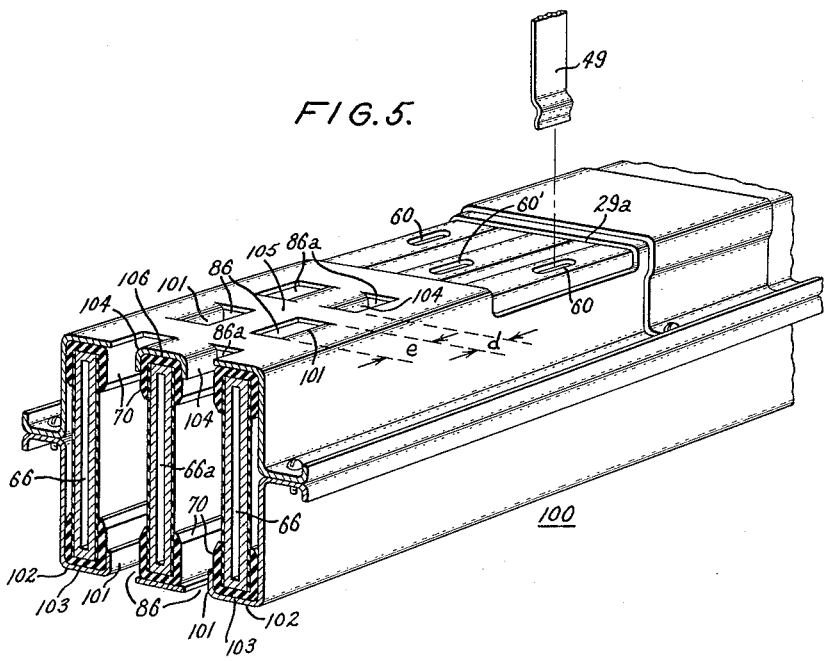

United States Patent Office 3,099,504
Patented July 30, 1963

3,099,504
ELECTRICITY DISTRIBUTING CONDUIT APPARATUS
Raymond N. Rowe, Plainville, Conn., assignor to General Electric Company, a corporation of New York
Original application June 13, 1955, Ser. No. 514,926, now Patent No. 3,018,320, dated Jan. 23, 1962. Divided and this application Nov. 29, 1961, Ser. No. 155,562
7 Claims. (Cl. 339—22)

My invention relates to electricity distributing conduit apparatus and, more particularly, to enclosed bus bar electricity distributing apparatus, such as used in factory and office buildings, capable of delivering fairly heavy multiphase currents ranging from 100 amperes to several thousand amperes per bus bar. This application is a division of application Serial No. 514,926, filed June 13, 1955, by R. N. Rowe and entitled Electricity Distributing Conduit Apparatus, now Patent 3,018,320, issued January 23, 1962.

Enclosed bus bar conduit apparatus are generally of the "feeder type" in which connections are made only to the opposite ends of each conduit section, or are of the "plug-in" type in which a plurality of branch take-off connections are made at spaced points along the length of each section. Present commercially available bus bar conduit apparatus capable of delivering the fairly heavy multiphase currents within the range mentioned above generally comprise prefabricated sections each having a plurality of flat bus bars supported in spaced parallel relation within an elongated metal housing by rugged and massive insulating blocks or assemblies located at spaced intervals along the length of the housing such that the bus bars are supported only along less than about 10% of their length. Although expensive insulating tape is sometimes wrapped around the bus bars, air is normally the sole dielectric between the spaced bus bars and between the bus bars and the housing in the longitudinally extending regions between these insulating supporting blocks. This is particularly true in bus bar conduit apparatus of the "plug-in" type where the bus bars are left bare in order to make connection with branch take-off units inserted within the conduit apparatus through suitable openings in its housing.

The minimum transverse spacing between the conductive components of such conduit apparatus is thus determined primarily by the dielectric strength of air under the operating voltage and temperature conditions of the apparatus. Where the conduit apparatus is of the "plug-in" type, the transverse spacing between the bus bars and between the metal housing and the bus bars is also often greater than that desired for optimum efficiency power distribution in order to accommodate the plug-in connectors of the branch take-off units. In addition, it has heretofore been thought undesirable to bring the metal housing into close proximity with the bus bars because of the likelihood of increased power and heat loss due to hysteresis and eddy currents generated in the housing as well as increased impedance in the bus bars themselves.

As a consequence bus bar conduit apparatus designed to carry fairly heavy currents at moderate voltages now have considerable cross-sectional area. For example, currently available three-phase three-bar plug-in type bus bar conduit apparatus designed to carry 1000 amperes at 600 volts generally have rectangular housings about 7¼-inches wide and 6¼-inches deep and are made of steel not less than ¹⁄₁₆-inch thick in order to be able to sustain the large size and weight of the conduit apparatus.

Present commercially available electricity distributing bus bar apparatus also involve undesirable inherent limitations in the minimum size and strength of the bus bars employed. The minimum interphase spacing between the bus bars necessitated by the use of air as the sole dielectric also determines the minimum interphase inductive reactance. This, in turn, partially determines the minimum cross-sectional area which each bus bar may have in order to keep within a tolerable voltage drop and allowable temperature rise for the amount of current to be carried. In addition, the intermittent supporting of the bus bars by longitudinally-spaced insulating blocks necessitates the use of bus bars which are mechanically self-supporting in the regions between the insulators even under substantial mechanical stresses and vibration produced by the interaction of the magnetic fields surrounding the conductors under heavy currents. For example, a copper bus bar designed to carry 1000 amperes in present conduit apparatus generally has a cross-sectional area of about one square inch, with a thickness not less than 0.25 inch and a width of about 4 inches.

Conduit apparatus employing air-surrounded bus bars also have certain undesirable operational characteristics and hazards. Good temperature regulation is difficult to achieve since heat transfer from the bus bars to the housing or external atmosphere must be accomplished almost entirely through radiation or convection rather than by solid heat conduction. Moreover, if an arc should occur between two bus bars or between a bus bar and the housing, this arc tends to travel the entire length of the bus bar section often irreparably damaging the section as well as any electrical equipment which may happen to be connected in the path of the traveling arc. Furthermore, where a branch take-off unit is plugged into the exposed air-surrounded bus bars through suitable openings in the housing, there is a considerable danger of electric shock due to accidental touching of these exposed bus bars or of burning due to arcing and flash-over during the installation or removal of the take-off unit.

Such intermittently supported air-surrounded bus bar distribution apparatus also are not usually well adapted to techniques of mass production and automatic assembly. For example, they are not well adapted to the use of continuous manufacturing processes such as extrusion, rolling and grinding since they are not of uniform cross section along the entire length of the conduit. They are likewise not adapted for automatic assembly since the bus bars must generally be individually fastened within their supporting insulators and the bus bars of one section individually fastened to the bus bars of an abutting section.

Accordingly, a general object of the invention is to provide a prefabricated electricity distributing bus bar conduit apparatus which eliminates or minimizes the above-mentioned objections and limitations of prior bus bar conduit apparatus.

More specifically, an object of the invention is the provision of bus bar conduit apparatus of reduced size and weight, and in which the bus bars are more closely spaced thereby to reduce the interphase reactance, together with more effective means for cooling the bus bars by the transfer of heat to the outside air with provision for the flow of cooling air around the housing to increase the cooling effect, and in which the danger of electric shock by contact with the bus bars through ventilating openings is minimized.

Another object is the provision of bus bar conduit apparatus including a novel and improved arrangement for defining ventilating slots in the housing and for supporting the bus bars transversely of the housing.

Another object is the provision of means for supporting the bus bars, both edgewise and transversely, over a large part of their length with resulting reduction in size of the bus bars and the elimination of vibration and consequent noise, together with a resilient support for the bus bars for cushioning and absorbing bus bar vibrations.

Still another object of the invention is the provision of means integral with the housing serving to support the bus bars transversely of the housing.

In general, electricity distributing conduit apparatus embodying one basic and simple form of the invention comprises an elongated metal housing within which a plurality of bus bar assemblies extend longitudinally in parallel spaced relation with each other and in edgewise relation with a pair of opposed walls of the housing. The term "bus bar assembly" is used herein to connote a single bus bar or a plurality of bus bars or conductive wall portions mechanically supported together and electrically interconnected so as to form a general electrical conductor capable of carrying a single phase of current. The bus bar assemblies are substantially continuously supported edgewise between these opposed housing walls by thin individual strips of insulating material enveloping the opposite edges of each bus bar and extending substantially longitudinally coextensive therewith. The opposed walls of the housing contain integral means for supporting the bus bar assemblies transversely preferably in the form of longitudinally extending spaced ridges, flanges, or corrugations which provide spaced parallel longitudinally extending channels within which the insulating strips, preferably of U-shaped cross section, are seated. Because of the great dielectric strength of such thin continuous strips of insulating material, the opposed walls of the metal housing can be brought into close proximity with the bus bars without danger of arcing thereby reducing the over-all height of the conduit apparatus.

Flat thin sheets of insulating material are inserted beneath the enveloping arms of the U-shaped insulating strips to cover the outer major flat surfaces of the bus bars of each bus bar assembly. Each bus bar assembly is thus completely surrounded by insulation and the parallel spaced bus bar assemblies carrying different phase currents are located much closer together and to the sides of the metal housing than in the case of bare bus bars without danger of arcing. In fact, contrary to normal expectation it has been found that the insulated bus bar assemblies may be supported against the sides of the metal housing without excessive temperature rise, housing eddy currents or reactively induced bus bar impedance even under currents as high as 1000 amperes per bus bar. A bus bar conduit embodying these features of the invention may thus not only be reduced in height or depth but may likewise be reduced in width for a given voltage and current rating. Moreover, the closer proximity between the bus bar assemblies of different phases has the effect of further reducing the impedance of any bus bar assembly due to interphase reactance and thus functions to increase the efficiency of power distribution.

In accord with a still further aspect of the invention, my bus bar conduit apparatus may be constructed as a plug-in type to receive and supply power to branch plugs or power take-off units having either male- or female-type plug-in connectors. When used with branch take-off units having female-type connectors, portions of the bus bar edge-enveloping insulating strips are removed beneath suitable openings in the housing to expose the bus bars for connection with the female connectors. More advantages accrue, however, when plug-in conduit apparatus embodying the invention is constructed for use with branch take-off units having male or stab-type connectors. In accord with this embodiment of the invention, each bus bar assembly comprises a pair of parallel conductive bars or wall portions. The generally U-shaped insulating strips continuously cover each bus bar assembly even beneath the plug-in openings in the housing, and slots are provided in these insulating strips through which each male or stab connector can be inserted into a space between the opposed parallel walls of each bus bar assembly which thus act as the female socket for the stab connector.

In accord with a further important feature of the invention, the opposed housing walls may have a plurality of longitudinally spaced rows of ventilating slots formed therein by flanges bent inward from the housing walls, which rows of flanges may also provide the longitudinally extending channels for seating the continuous insulating strips.

The novel features believed characteristic of the invention are set forth in the appended claims. The invention itself, however, together with further objects and advantages thereof can best be understood by referring to the following description taken in connection with the accompanying drawings..

In the drawings FIGURE 1 is a perspective cross-sectional view of a plug-in type bus bar conduit apparatus embodying the invention and adapted to accommodate branch take-off units having female-type plug-in connectors.

FIGURE 2 is a perspective cross-sectional view of a portion of a feeder-type bus bar conduit apparatus embodying the general invention.

FIGURES 3, 4 and 5 are each perspective cross-sectional views of different bus bar conduit apparatus embodying improved forms of the invention, and adapted for use either as a feeder type or plug-in type in which latter case they can accommodate branch take-off plugs having male or stab plug-in connectors.

FIGURES 4a and 4b are detail views of modifications of the ventilating hole construction of the conduit housing of FIGURE 4.

In the drawings similar components are designated by the same reference numerals.

Referring to FIGURE 1, one simplified form of the invention is shown as comprising a plug-in type conduit apparatus 9 having an elongated metal housing 10 enclosing an area of substantially rectangular cross section and made up of two preferably identical troughs 11 and 12 of generally U-shaped cross section. Troughs 11 and 12 each have outwardly projecting flat shelves or rims 13 and 14 respectively, integrally formed with the sides thereof. Shelves 13 and 14 contiguously abut each other and extend in planes parallel to the planes of the flat bottoms 15 and 16 of troughs 11 and 12, which flat bottoms 15 and 16 form opposed walls of the metal housing 10. Shelves 13 and 14 each terminate in return-bent lips or flanges 17 and 18 respectively, extending in planes parallel to the side walls 19 and 20 of troughs 11 and 12. A plurality of registering holes 21 are closely spaced along the length of shelves 13 and 14. These holes 21 not only accommodate several bolts 45 for fastening together the two trough sections 11 and 12 of the housing 10 but also accommodate suitable hangers 22 by means of which conduit apparatus 9 may be supported upon a wall or ceiling of a building. Moreover holes 21 enable the free circulation of convection air currents adjacent the side walls 19, 20 of housing 10 which currents might otherwise be trapped under shelves 14 leaving a dead air space or pocket in the region immediately above shelves 13. In addition, holes 21 as well as flanges 17 and 18 may be used to support and permit fastening down of branch take-off units plugged onto the conduit apparatus.

In accord with one aspect of the invention, means are provided for substantially continuously supporting a plurality of spaced bus bar assemblies both edgewise and transversely within the housing 10. In conduit apparatus 9 the bottom walls 15 and 16 of metal troughs 11 and 12 each have integrally formed longitudinally extending spaced parallel ridges 23 projecting inwardly within the housing 10. The inner surfaces of opposed walls 15 and 16 are thus longitudinally corrugated to provide spaced longitudinally extending channels 24. The bus bar assemblies constitute flat metal bus bars 25 supported in spaced parallel planar relation with each other and in edgewise insulated relation with opposed walls 15 and 16 by means of suitable insulating strips 26 seated as snug fits within channels 24 of the metal troughs 11 and 12 and enveloping opposite edge portions 27 and 28 of each bus bar 25. Insulating strips 26 are preferably of U-shaped cross section, as shown, and extend continuously in the longitudinally extending channels 24 within which they are removably seated. The opposite edge portions 27 and 28 of bus bars 25 are likewise removably seated within the internal channels 26' provided by these U-shaped insulating strips.

A pluraltiy of longitudinally spaced generally rectangular openings 29 (only one shown in FIGURE 1) are provided in either one or both bottom walls 15 and 16 of metal troughs 11 and 12 for enabling insertion of suitable branch take-off units. The insulating strips 26 are terminated slightly beyond the rims 30, 31 defining opening 29 and thus expose portions 32 of bus bars 25 beneath the center of opening 29. Branch take-off units having conventional female-type connectors may then be plugged onto exposed portions 32 of bus bars 25 in a conventional manner such as shown, for example, in Patent 2,161,571, granted to Frank Harvey on June 6, 1939, originally assigned to the Trumbull Electric Company and now assigned to the General Electric Company.

A door 33 fastened by hinges 34 to the housing 10 in the regions 39 bridging the spaces between bus bars 25 is provided for covering opening 29 when not being used to receive a branch take-off unit. A sheet 35 of insulating material covers the side of the door facing the exposed bus bars when the door is closed. Alternatively, the door 33 may be entirely constructed from an insulating material. Insulating sheet 35 may be fastened to metal door 33 by the same rivets 36 which serve to fasten the hinges 34 and the latch 37 to the door 33. Ventilating slots 38 are preferably also provided in the opposed walls 15 and 16 of the housing in the regions 39 bridging the spaces between the bus bar assemblies.

The resulting bus bar conduit apparatus 9 of FIGURE 1 is unusually simple to manufacture and assemble. Only three basic components, excepting doors 33, are required; namely, the U-shaped troughs 11, 12, bus bars 25 and insulating strips 26. All of these components are of uniform cross section along their entire length so that they may be easily manufactured by an extrusion process, if desired. Openings 29 and ventilating slots 38 may be stamped out of the metal troughs 11 and 12 after they are formed. These components also lend themselves to other continuous manufacturing processes, such as grinding and rolling. In the assembly of the conduit apparatus 9 the insulating strips are first pressed over the opposite edge portions of each bus bar 25. One insulated edge portion 28 of each bus bar is then seated within a channel 24 of a bottom wall 16 of metal trough 12. The other metal trough 11 is then brought into place to complete the rectangular housing and its internal channels 24 are pressed over the opposite insulated edge portions 27 of the bus bars 25. The entire assembly is then fastened together by inserting and tightening down the nuts on bolts 45. Doors 33 may be attached to the housing 10 either before or after the housing assembly operation.

Although somewhat exaggerated in the drawings, insulating strips 26 are preferably less than 0.2 inch thick and may be made of any material having good electric insulating, heat conducting and arc resistant characteristics and good mechanical strength. The material should also be able to withstand elevated temperatures without deterioration. Preferably they comprise moldable or extrudable plastic or rubber base materials which are light weight and slightly resilient. Fire resistant vinyl resins such as a plasticized polyvinyl chloride including a mineral filler such as asbestos and a small percentage of a polyester resin have been found particularly suitable for insulating strips 26. Glass reinforced polyester resins as well as other plastic insulating materials such as commonly used for insulating flexible cables have also been found to be suitable. Glass tape impregnated with vinyl resins and formed to the desired U-shaped cross section may likewise be used.

The use of continuous solid insulating strips 26 instead of air between the edges of bus bars 25 and housing 10 along its entire length involves several important advantages. It enables the opposed walls 15 and 16 of the housing to be brought much closer together than conventional bus bar conduit apparatus for the same current and voltage ratings. Heat dissipation is improved by direct conduction from the bus bars to the housing through the strips with the result that the temperature rise and bus bar impedance does not increase over prior conduit apparatus despite the closer proximity between a magnetic housing and the edges of the bus bars even under currents of the order of 1000 amperes. For maximum heat dissipation, bus bars 25 should be fitted tightly against strips 26 and strips 26 should be pressed tightly against housing 10 with no air gaps therebetween. Insulating strips 26 need not be made of strong or heavy ceramic materials both because the weight of the bus bars is distributed along the entire length of the conduit apparatus and because the strips 26 need not carry bolts or other means for fastening the bus bars thereto. Consequently, insulating strips 26 are much lighter in weight than spaced insulating blocks conventionally used to fasten and support bus bars within metal housings.

Because of the substantially continuous supporting of the bus bars throughout their length, mechanical stresses produced in the bus bars are uniformly distributed, and substantially no vibration of the bus bars occur even under stresses produced by unusually high currents. By using slightly resilient insulating material for the bus bar edge-enveloping insulating strips, any remaining vibration is cushioned and absorbed without transmittal to the housing.

For most electricity distributing applications metal troughs 11 and 12 may be made of a non-magnetic material, such as aluminum, or of a magnetic material such as steel. Aluminum is preferaly used, however, in bus bar conduit apparatus 9 of FIGURE 1 where the apparatus is destined to carry high currents of the order of 1000 amperes per bus bar. This is because aluminum more readily lends itself to an extrusion manufacturing process and, in addition, reduces the eddy currents generated in the housing. The aluminum should be of a medium or low conductivity grade, however, since it has been found that aluminum of high electrical conductivity may still generate excessive eddy currents and high housing temperatures. It will be observed that with the construction of the bus bar conduit apparatus 9 of FIGURE 1, the sides of the bus bars 25 are exposed with only air dielectric therebetween so that the spacing S between bus bars must still be large enough to prevent arcing therebetween at common industrial voltages employed. Consequently, where the bus bars 25 cary different phase currents, the interphase reactance is still fairly large thereby increasing the electrical impedance of each bus bar and fairly strong eddy currents may be induced in the housing as a result of strong non-cancelled magnetic fields around each conductor 25.

In FIGURES 2 through 5, I have shown other embodiments of the invention whereby further reduction in cross-sectional size may be achieved over that provided by the conduit apparatus 9 of FIGURE 1 and a magnetic metallic housing, for example, steel, may still be employed even if the bus bar conduit apparatus is intended to carry heavy currents, for example, above 1000 amperes per bus bar assembly.

Referring to FIGURE 2 I have shown a feeder-type bus bar conduit apparatus 40 employing bus bars 25 of the same dimensions as those of the conduit apparatus 9 of FIGURE 1. The reduction in over-all size of the conduit 40 over that of conduit 9 is immediately apparent from an inspection of these figures. In conduit 40 of FIGURE 2 a pair of flat elongated insulating sheets 41 and 42 made from customary sheet insulating materials cover the opposing flat major surfaces of each bus bar 25. One insulating sheet material found to be particularly suitable is Rogers #880 insulating board currently available from the Rogers Corporation, Rogers, Connecticut. These insulating sheets 41, 42 are preferably less than 0.10 inch thick and are held in place against the bus bar beneath and between the sides of the U-shaped insulating strips 26a. The insulating sheets 41, 42 serve to help insulate the bus bars from one another and from the sides 19, 20 of the metal housing 43. The U-shaped insulating strips 26a not only serve to support the opposite edges of the bus bars 25 and to position the insulating sheets 41 and 42 but in addition also serve to prevent arcing between the extreme edges 46 of adjacent bus bars, which edges are not covered by the insulating sheets 41, 42. Longitudinally split housing 43 is made up of two identical trough sections 11a, 12a, the bottom walls 15a, 16a of which are longitudinally corrugated to form alternate external ridges 23a and channels 24a. For even greater strength the two metal troughs 11a and 12a of housing 43 are fastened together by a metal clamping strip 44 of C-shaped cross section which is folded over the return-bent flanges 17 and 18 of the housing troughs.

Because of insulating sheets 41, 42 the bus bars 25 of conduit 40 may be more closely spaced than those of conduit 9 of FIGURE 1. This not only makes possible the reduction in size of the housing 43 but also reduces the interphase inductive reactance of the system. Consequently, the bus bars have less impedance for a given length and cross section and the strength of non-cancelled magnetic fields surrounding the conductors and tending to produce eddy currents in the housing is likewise reduced.

In fact, contrary to prior expectation, it has been found possible to support the outer bus bar assemblies directly against the sides of housing 43, as shown in FIGURE 2, and separated only by the thickness of one leg of the insulating strip 26a and one insulating sheet 41 without excessive increase in bus bar impedance or temperature rise.

In addition, it has been found that the corrugations in the walls 15a and 16a of the housing 43 considerably increase their mechanical strength. As a result of these factors; namely, reduction in size, weight and interphase reactance of the system as well as increased strength through corrugation, the metal housing may have a thickness less than that employed in conventional bus bar conduit apparatus having the same voltage and current ratings. In addition, it has been found possible to employ magnetic materials such as steel of thin gauge, with or without corrugation, even with bus bar conduit apparatus 40 intended for use at high-current ratings, for example, of 1000 amperes or more per bus bar assembly. Non-magnetic materials such as aluminum are, however, suitable and may be used. As an example, of the possible reduction in size of metal housing 43, conventional intermittently supported air dielectric bus bar conduit apparatus rated at a 1000 amperes and 600 volts now customarily utilizes a steel housing having an internal cross-sectional area of 44.5 inches while bus bar conduit apparatus 40 of FIGURE 2 may utilize a steel housing 43 having an internal cross-sectional area of only 13.5 inches.

One further advantage of the construction of conduit 40 is that the corrugated nature of the housing provides greater surface area for dissipation of heat to the surrounding atmosphere so that the entire conduit tends to operate at a somewhat lower temperature than would be the case with a flat surfaced housing.

In FIGURES 3 through 5 I have shown alternative embodiments of the invention whereby it may be used with branch take-off units having male plug-in connectors such as designated by numeral 49. In the conduit apparatus 50 of FIGURE 3 each bus bar assembly 48 comprises a pair of closely-spaced electrically interconnected bus bars 51, 52 rather than the single bus bar 25 of conduits 9 and 40 of FIGURES 1 and 2. Each of the three twin bus bar assemblies 48 is adapted to carry a different phase of electrical current. The thickness of each of the bus bars 51 and 52 is preferably made less than the thickness of a single bus bar 25 for the same current rating, in order to provide a higher ratio of surface to cross-sectional area, thereby to provide more efficient conduction. It has been found that a bus bar assembly, such as assembly 48 having two closely-spaced thin flat wall portions has considerably less impedance to alternating current than a single somewhat thicker bus bar.

In conduit apparatus 50, generally U-shaped insulating strips 55 have a central internal longitudinal ridge 56 according to the invention which provides two closely-spaced channels 53, 54 within which the edge portions of bus bars 51, 52 of each assembly 48 are seated and enveloped. The insulating sheets 41a and 42a cover the outer flat surfaces of the bus bars 51 and 52, respectively, leaving their inner confronting flat surfaces bare. The metal housing 57 has longitudinal corrugation in its opposed bus bar supporting walls 15b, 16b in the form of narrow folds 58. As a consequence, the outer surfaces of these walls 15b, 16b are flat and planar with the exception of the slight interruptions provided by these narrow folds 58. Longitudinally extending and spaced ventilating slots 38 are preferably provided in the opposed walls 15b, 16b of housing 57 in the regions thereof bridging the spaces between the bus bar assemblies. Longitudinally spaced openings 29a for accommodating branch take-off units are provided in these opposed housing walls 15b, 16b with the openings in one wall 15b being out of transverse alignment with the openings in the other wall 16b. Openings 29a extend a short distance into side walls 19a, 20a of housing 57 in order to provide requisite electrical clearance between the side edge 61 of the opening and bare inner surface of bus bars 51, 52 beneath slots 60 in strips 55.

In contrast to the bus bar distribution apparatus 9 of FIGURE 1 the edges of the bus bars 51, 52 beneath the plug-in openings 29a are not exposed but rather are covered by the insulating strips 55 which are continuous and envelop these bus bar edge portions even beneath these openings 29a. Longitudinally extending slots 60 are formed in the base region of the generally U-shaped insulating strips 55 to permit entrance of the male stab connectors 49 into the close space between the two bus bars 51 and 52. Stab connectors 49 may conveniently be of resilient metal strip material thereby to make tight frictional engagement and contact with the inner confronting bare major surfaces of these bus bars 51, 52.

Covers 62 of generally U-shaped cross-section are provided for openings 29a, which covers are fastened to housing 57 in either open or shut position by the same bolts 44 which fasten the two trough sections 11b, 12b of the housing together. Covers 62 each terminate in shelves 63 outwardly flared from the sides thereof. Each shelf 63 has a longitudinally extending indentation 64 along its edge. The shank portion of the bolts 44 which fasten the two trough sections of the housing together ride against the edges of indentations 64 and the heads of these bolts 44 serve to clamp the shelves 63 of covers 62 against the flat shelves 13, 14 of the housing 57 in either the open or shut position relative to opening 29a. Projecting feet or flanges 63a of cover shelf 63 act as stops limiting the longitudinal slideable movement of cover 62 to the open and shut positions.

Covers 62 have their lower side portions 62a bearing against the sides 19a or 20a of housing 57 but preferably have their upper side portions 62b and covering base portions 62c slightly spaced from the outer surface of housing 57 in order to provide the requisite electrical clearances between the undersurface of cover 62 and the exposed inner surfaces of bus bars 51, 52 beneath slots 60.

The plug-in type conduit apparatus 50 of FIGURE 3 has all the advantages in size and weight of the feeder-type conduit apparatus 40 of FIGURE 2. The twin bus bar assemblies 48 for each phase are similarly closely spaced and the metal housing may be formed of magnetic or non-magnetic metals even for use with bus bars carrying heavy currents. The components of the conduit 50 each are continuous with the same cross section throughout their length and thus are amenable to fabrication by modern continuous manufacturing processes. In addition, the extension of the insulating strips 55 to cover the edges of the bus bars beneath the plug-in openings 29a functions to protect personnel installing the branch take-off units from the hazards of electrical shock and burning. Moreover, the use of a divided or twin bus bar assembly for carrying each phase of current in combination with a male plug-in connector which is inserted between the bus bars of each pair enables the bus bar assemblies to be closely spaced together since the inserted male connectors do not occupy or introduce electrically live parts in this space between the bus bar assemblies carrying different phase currents. In fact, the twin bus bars 51, 52 by their arrangement function as an electrical shield around the inserted male connector stabs 49.

Referring now to FIGURES 4, 4a, 4b and 5, there are shown alternative embodiments of the invention utilizing tubular bus bars whereby in accord with the invention flanges bent inwardly from the opposed walls of the housing not only define longitudinally spaced ventilating openings but, in addition, serve to support transversely the bus bar assemblies along a considerable percentage of their length. In the conduit apparatus 80 of FIGURE 4, two elongated flanges 81, 82 of short extension are bent inwardly from the flat opposed walls 83, 84 of housing 85 in the regions between the central and outer bus bar assemblies and define the sides of ventilating slots 86. The outermost flanges 81 cooperate with the side walls 87, 88 of the housing sections 89, 90 to form longitudinally extending channels 91 for seating the U-shaped insulators 70 of the outer bus bar assemblies 66. The central flanges 82 cooperate to form longitudinally extending channels 92 for seating the central bus bar assembly 66a. In forming flanges 81 and 82 the portions 93 of the housing 85 bridging the spaces between the bus bar assemblies are intermittently centrally slit longitudinally and transverse slits are made meeting the opposite ends of each longitudinal slit. The portions on each side of the central longitudinal slit are then bent inwardly to form the two flanges 81, 82 for each resulting ventilating slot.

In FIGURE 4a, one modification of the ventilating slot construction of FIGURE 4 is shown in which triangular flanges 94, 95 replace the rectangular flanges 81 and 82 to define the ventilating slot 86 and support the opposite edge portions of the bus bar assemblies. In forming flanges 94, 95 the housing is cut in the form of a Z and the triangular portions on each side of the central diagonal slit are bent inwardly and constitute the flanges 94, 95.

In FIGURE 4b, another modification of the ventilating slot construction of FIGURE 4 is shown in which deeper flanges 96, 97 equal to the width of slots 86 but only ½ as long are employed. In forming flanges 96, 97 a right-angled zigzag cut is made in the housing and the portions on each side of the central transverse slit are bent inwardly from opposite sides of the housing portions defining the slot 86.

In FIGURE 5, another plug-in type conduit apparatus 100 is shown wherein only one supporting flange is made out of the housing material bent inwardly to form each ventilating slot. In this construction, the flanges 101 forming ventilating slots 86 at one longitudinal location in the housing are bent inwardly from and integral with the side adjacent portions 102 of the opposed housing walls thereby to form deeper channels 103 as compared with FIGURE 4 for seating the outermost bus bar assemblies 66. The flanges 104 forming ventilating slots 86a in longitudinally spaced positions on both sides of ventilating slots 86 are bent inwardly from and integral with the central portions 105 of the opposed housing walls thereby to form channels 106 for seating the central bus bar assembly 66a. In the embodiments of the invention shown in FIGURES 4, 4a, 4b and 5 the longitudinal distance d between the edges of adjacent ventilating slots is shown less than and is preferably no greater than the length e of the slots themselves. In this way the bus bar assemblies are supported transversely by the housing along about 50% of their length in the constructions of FIGURES 4 and 4a and along about 25% of their length in the constructions of FIGURES 4b and 5.

In the plug-in conduit apparatus 100 of FIGURE 5, the slots in the insulating strips 70 beneath the plug-in openings 29a for receiving plug-in stabs 49 are not all in transverse alignment but rather adjacent slots are offset longitudinally from one another; for example, the slot 60' in the central insulating strip 70 is positioned forward of the slots 60 in the outer insulating strips. In this way sufficient creepage distance is maintained to prevent arcing through these slots between the edges of the adjacent bus bar assemblies.

Although I have shown plug-in type conduit apparatus in the structures of FIGURES 1 and 3 through 5, it will be appreciated that any of these structures may be modified to serve as feeder-type bus bar conduit apparatus by simply omitting the longitudinally spaced plug-in unit receiving openings 29, 29a and continuously extending the insulating strips coextensively with the bus bars. The same bus bar conduit apparatus may thus be used both for feeder type or plug-in type conduit apparatus. Means (not shown) are provided for making electrical and mechanical connection between the abutting ends of two prefabricated lengths or sections of conduit apparatus such as shown in FIGURES 3 through 5.

Although I have described above specific embodiments of my invention many modifications may be made. For example, more than three bus bar assemblies may be provided within any of the conduit apparatus described. I intend, therefore, by the appended claims to cover all such modifications as fall within the true spirit and scope of the invention.

What I claim as new and desire to secure by Letters Patent of the United States is:

1. Electricity distributing conduit apparatus comprising a housing having a pair of opposed generally parallel walls, a plurality of bus bar assemblies extending in parallel spaced relation within said housing in edgewise relation to said walls, a plurality of flanges integral with said walls and bent inwardly therefrom, said flanges being spaced longitudinally of the housing to form and define a plurality of ventilating slots in said walls, said flanges also defining a plurality of spaced generally parallel channels, and insulation enveloping the longitudinal edges of said bus bar assemblies and seated within said channels whereby said flanges transversely support the bus bar assemblies, said ventilating slots being intermediate said channels and intermediate the bus bar assemblies in communication with the spaces between the bus bar assemblies.

2. Electricity distributing conduit apparatus comprising an elongated metal housing having a pair of opposed parallel walls, insulated bus bar assemblies transversely spaced and extending longitudinally within said housing in edgewise relation with said opposed walls, parallel rows of longitudinally extending and spaced flanges integral with and inwardly bent from said opposed housing walls to bear against and support the longitudinal edge portions of said insulated bus bar assemblies, said opposed housing walls having parallel rows of longitudinally extending and spaced ventilating slots formed and defined by said inwardly bent supporting flanges, said ventilating slots being intermediate the bus bar assemblies in communication with the spaces therebetween.

3. Apparatus as defined in claim 2 wherein the longitudinal spacing between the ventilating slots does not exceed the length of the flanges.

4. Apparatus as defined in claim 2 wherein each ventilating slot is formed and defined by two inwardly bent flanges depending from opposite longitudinal rims of each slot.

5. Apparatus as defined in claim 2 wherein each ventilating slot is formed and defined by one inwardly bent flange depending from one longitudinal rim of each slot with longitudinally consecutive flanges depending from different longitudinal rims of the longitudinally spaced slots in each row thereof.

6. Electricity distributing conduit apparatus comprising an elongated housing having two pairs of opposed metal walls, a plurality of bus bar assemblies extending in parallel spaced relation within said housing in edgewise relation to one pair of said walls, a plurality of flanges integral with the walls of said one pair and bent inwardly therefrom towards one another, said flanges being spaced longitudinally of the housing to form and define a plurality of ventilating slots in the walls of said one pair, said flanges also defining a plurality of spaced generally parallel and inwardly facing channels, and insulating strips of generally U-shaped cross section enveloping the opposite longitudinal edges of each bus bar assembly, said U-shaped strips being seated within said channels with one of the sides of each outer strip against a respective one of the walls of said other pair of walls, said ventilating slots being intermediate said channels and intermediate the bus bar assemblies in communication with the spaces between the bus bar assemblies.

7. Electricity distributing conduit apparatus comprising a pair of separate elongated metal walls of unitary construction and having generally planar external surfaces, at least one of said walls having a plurality of longitudinally-spaced openings for accommodating branch take-off units, means fastening said walls in opposed spaced parallel relation to form a housing enclosing an area of substantially rectangular cross section, at least three parallel spaced bus bar assemblies extending longitudinally within said housing and beneath said openings in edgewise relation to said opposed walls, each bus bar assembly comprising a pair of parallel individual bars which are spaced at least at areas beneath said openings, insulation completely surrounding each pair of individual bars, said insulation extending across and enveloping the longitudinal edges of the individual bars and being coextensive with said bus bar assemblies, the insulation for each bus bar assembly where it extends across the edges of the individual bars being resilient and also having slots beneath said openings aligned with the spaces between said individual bars to permit entry of connectors of take-off units into the spaces between said individual bars, means for supporting said bus bar assemblies including metallic support means extending along the inner surfaces of said opposed housing walls and defining inwardly facing channels having opposed flat bases parallel to said external surfaces and which tightly engage the resilient insulation at the edges of the bus bar assemblies, said channels being located entirely inwardly of the planes of said external surfaces, and a cover mounted on the housing for sliding movement to cover and expose said openings.

References Cited in the file of this patent

UNITED STATES PATENTS

| | | |
|---|---|---|
| 2,057,891 | Frank | Oct. 20, 1936 |
| 2,059,086 | Frank et al. | Nov. 3, 1936 |
| 2,059,188 | Frank | Nov. 3, 1936 |
| 2,072,102 | Beersman | Mar. 2, 1937 |
| 2,086,795 | Frank | July 13, 1937 |
| 2,215,318 | Bristol | Sept. 17, 1940 |
| 2,261,857 | Novak et al. | Nov. 4, 1941 |
| 2,264,075 | Frank | Nov. 25, 1941 |
| 2,318,859 | Huguelet | May 11, 1943 |
| 2,482,310 | Adam | Sept. 20, 1949 |
| 2,495,526 | King | Jan. 24, 1950 |
| 2,576,774 | Carlson | Nov. 27, 1951 |
| 2,675,434 | Herrmann | Apr. 13, 1954 |
| 2,805,907 | Oom | Sept. 10, 1957 |

FOREIGN PATENTS

| | | |
|---|---|---|
| 129,350 | Germany | Apr. 29, 1902 |